United States Patent
Bryant et al.

(10) Patent No.: US 10,033,680 B2
(45) Date of Patent: Jul. 24, 2018

(54) METHOD FOR PRIMING INBOX AND CONVERSATIONS DURING INITIAL SYNCHRONIZATION OF MESSAGES

(71) Applicant: BlackBerry Limited, Waterloo (CA)

(72) Inventors: Cody Bryant, Waterloo (CA); Ronesh Puri, Dundas (CA); Andrew John Ewanchuck, Baden (CA); David Andrew Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 283 days.

(21) Appl. No.: 14/924,668

(22) Filed: Oct. 27, 2015

(65) Prior Publication Data

US 2017/0118157 A1 Apr. 27, 2017

(51) Int. Cl.
G06F 15/16 (2006.01)
H04L 12/58 (2006.01)
H04W 56/00 (2009.01)
H04W 88/02 (2009.01)

(52) U.S. Cl.
CPC .............. *H04L 51/22* (2013.01); *H04L 51/26* (2013.01); *H04W 56/001* (2013.01); *H04L 51/16* (2013.01); *H04W 88/02* (2013.01)

(58) Field of Classification Search
CPC ......... H04L 51/16; H04L 51/22; H04L 51/26; H04W 56/001; H04W 88/02
USPC ................ 709/201, 202, 203, 204, 205, 206
See application file for complete search history.

(56) References Cited

U.S. PATENT DOCUMENTS

| | | | |
|---|---|---|---|
| 7,613,777 B2 | 11/2009 | Giles | |
| 8,312,096 B2 | 11/2012 | Cohen | |
| 8,533,274 B2 | 9/2013 | Buchheit | |
| 8,533,275 B2 | 9/2013 | Tousignant | |
| 9,723,460 B1 * | 8/2017 | Onyon | H04W 4/12 |
| 2003/0076843 A1 * | 4/2003 | Holbrook | H04L 29/06 370/401 |
| 2005/0039048 A1 | 2/2005 | Tosey | |
| 2006/0080354 A1 * | 4/2006 | Berger | G06F 17/30286 |
| 2007/0073817 A1 * | 3/2007 | Gorty | G06F 21/33 709/206 |
| 2007/0073819 A1 * | 3/2007 | Gardner | G06Q 10/107 709/206 |
| 2007/0073884 A1 * | 3/2007 | Clarke | G06F 9/542 709/226 |

(Continued)

OTHER PUBLICATIONS

Mailbox synchronization and EWS in Exchange, https://msdn.microsoft.com/en-us/library/office/dn440952(v=exchg.150).aspx.
(Continued)

*Primary Examiner* — Davoud Zand
(74) *Attorney, Agent, or Firm* — Rowand LLP

(57) ABSTRACT

A method for synchronizing a mobile device with a message mailbox is described. The method includes: sending a request to the server to identify an initial subset of most recently received messages from among a plurality of messages for synchronization; retrieving the initial subset of messages from the server; and retrieving, from the server, messages belonging to a conversation that includes at least one of the messages in the initial subset, prior to retrieving more recently received messages that do not belong to any conversation that includes at least one of the messages in the initial subset.

21 Claims, 5 Drawing Sheets

(56) References Cited

U.S. PATENT DOCUMENTS

| | | | |
|---|---|---|---|
| 2007/0083599 A1* | 4/2007 | Provo | G06F 17/2229 709/206 |
| 2007/0088791 A1* | 4/2007 | Clarke | H04L 51/22 709/206 |
| 2007/0226304 A1* | 9/2007 | Virk | G06Q 10/107 709/206 |
| 2007/0270547 A1* | 11/2007 | Bair | C04B 24/163 525/88 |
| 2007/0299918 A1* | 12/2007 | Roberts | G06Q 10/107 709/206 |
| 2008/0120129 A1* | 5/2008 | Seubert | G06Q 10/06 705/35 |
| 2008/0256197 A1* | 10/2008 | Deshpande | H04L 51/00 709/206 |
| 2008/0270547 A1* | 10/2008 | Glickstien | H04L 67/1095 709/206 |
| 2008/0270548 A1* | 10/2008 | Glickstein | G06Q 10/107 709/206 |
| 2008/0280644 A1* | 11/2008 | Hugot | H04L 63/0853 455/556.2 |
| 2010/0082759 A1 | 4/2010 | Nalliah et al. | |
| 2010/0100590 A1 | 4/2010 | Palay et al. | |
| 2011/0295958 A1 | 12/2011 | Liu | |
| 2012/0149342 A1 | 6/2012 | Cohen et al. | |
| 2013/0091227 A1 | 4/2013 | Bhakar | |

OTHER PUBLICATIONS

EPO, Extended European Search Report relating to EP Application No. 16188846.6, dated Feb. 23, 2017.

\* cited by examiner

METHOD FOR PRIMING INBOX AND CONVERSATIONS DURING INITIAL SYNCHRONIZATION OF MESSAGES

TECHNICAL FIELD

The present disclosure relates to synchronization of data on mobile devices and, in particular, to methods for synchronizing messaging accounts on a mobile device.

BACKGROUND

Modern mobile devices are equipped to facilitate access of a user's various messaging accounts. For example, a mobile device may be loaded with a mail client software application which provides "on-device" access and management of email mailboxes belonging to a user of the device. In general, a messaging client application on a mobile device can be used to access messages that are stored in one or more message mailboxes on remote servers.

A mobile device can be synchronized with a message mailbox to store messages locally on the device. Message mailboxes often contain a large amount of message data due to high volumes of messages and/or large message body and attachment sizes. Various factors, such as network bandwidth, server traffic load and limits on mobile data usage, can influence the synchronization of message data between the mobile device and the device user's message mailboxes. These factors can often render generic techniques for message synchronization unproductive for the device user.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
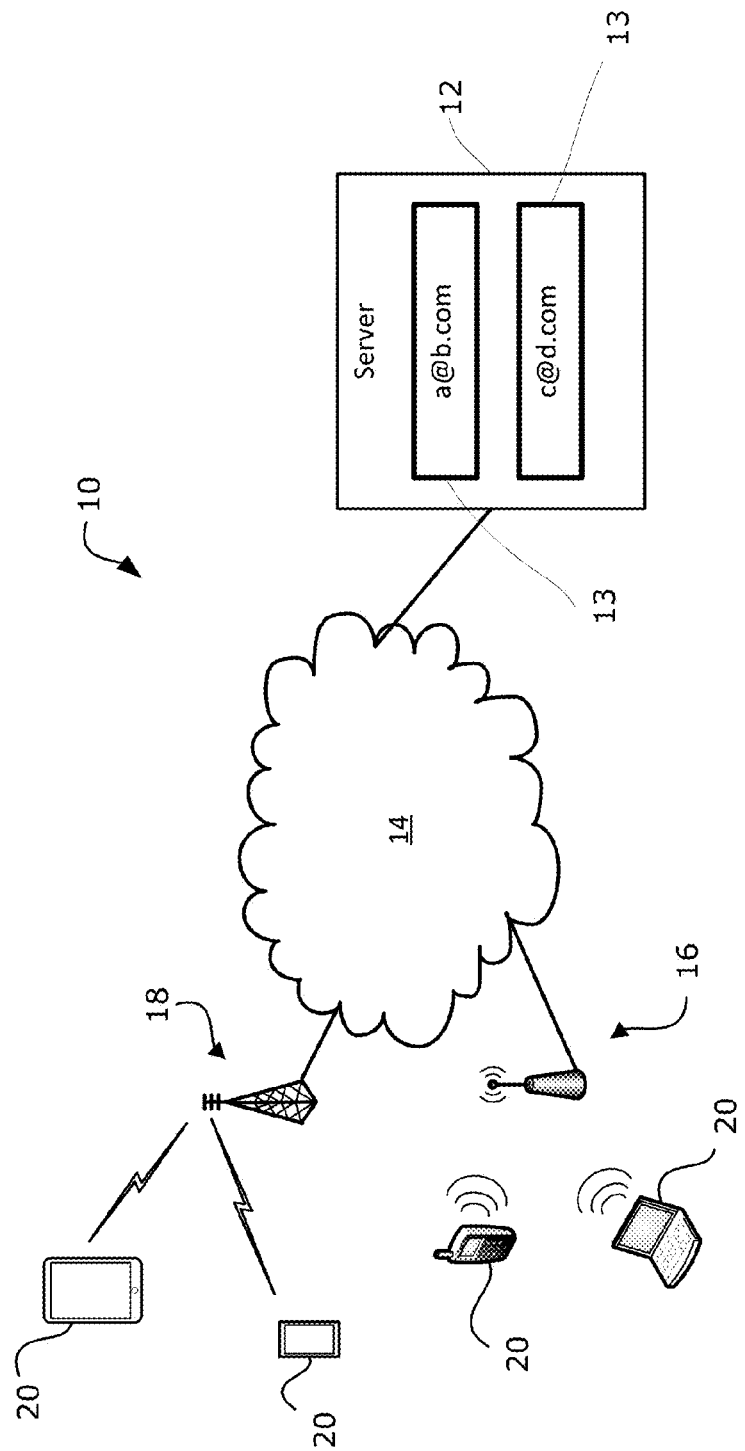
FIG. 1 is a block diagram illustrating an example system for synchronizing a mobile device with a message mailbox on a server.

In one aspect, the present disclosure describes a method performed by a mobile device for executing synchronization of the mobile device with a message mailbox on a server, where the message mailbox contains a plurality of messages for synchronization. The method includes sending a request to the server to identify an initial subset of the most recently received messages from among the plurality of messages for synchronization and retrieving the initial subset of messages from the server. The method further includes retrieving, from the server, messages belonging to a conversation that includes at least one of the messages in the initial subset, prior to retrieving more recently received messages that do not belong to any conversation that includes at least one of the messages in the initial subset.

In another aspect, the present disclosure describes a mobile device comprising a memory, a communications subsystem, an input interface and a processor coupled with the memory and the communications subsystem. The processor of the mobile device is configured to execute synchronization of the mobile device with a message mailbox on a server, where the message mailbox contains a plurality of messages for synchronization. The processor is configured to send a request to the server to identify an initial subset of the most recently received messages from among the plurality of messages and retrieve the initial subset of messages from the server. The processor is further configured to retrieve, from the server, messages belonging to a conversation that includes at least one of the messages in the initial subset, prior to retrieving more recently received messages that do not belong to any conversation that includes at least one of the messages in the initial subset.

Other example embodiments of the present disclosure will be apparent to those of ordinary skill in the art from a review of the following detailed descriptions in conjunction with the drawings.

The present disclosure makes reference to "email mailbox". An "email mailbox" will be understood to refer to a remote mail storage on a server to which email messages are delivered. Typically, an email mailbox is identified by an email address created by or assigned to an individual. Access to an email mailbox is controlled by a mail service provider, and only authenticated users can read, delete or otherwise access the messages of the email mailbox. An email mailbox on a server is to be distinguished from a local mail storage which may be used by a messaging client application on a mobile device to store the messages retrieved from a corresponding email mailbox.

It will be appreciated that email is one example type of message and that the term "message" includes email and other types of messages such as, for example, instant messages, text messages, social media messages, or other messages that employ a mailbox on a server. In particular, the present application is not limited to email messages.

System Overview

Reference is first made to FIG. 1, which shows in block diagram form an example system 10 for synchronizing a mobile device with a message mailbox on a server. The system 10 includes a server 12 and one or more mobile devices 20. The mobile devices 20 may include smartphones, tablets, laptops or other electronic devices capable of communicating over wireless networks. The server 12 may be a computer or a network of computers. The mobile devices 20 are configured to connect to the server 12 using data connections established via one or more networks. In at least some embodiments, the networks may include wireless wide area networks (WWANs) 18. A WWAN 18 implements cellular network technologies, such as LTE, UMTS and GSM, for data communication. The WWAN 18 may be operated by a mobile network service provider which provides subscription packages to users of the mobile devices 20. In some embodiments, the networks may also include a wireless local area network (WLAN) 16, such as a Wi-Fi or WiMAX network, providing wireless connectivity to mobile devices in a local coverage area. As shown in system 10 of FIG. 1, data communication between the mobile devices 20 and the server 12 may traverse one or more data networks 14, such as the Internet. It will be appreciated that the data connection between the server 12 and the mobile devices 20 may include a number of intermediate devices, including proxy servers, relays, routers, switches and other network equipment.

In at least some embodiments, the server 12 may maintain a plurality of message mailboxes 13, each message mailbox corresponding to a messaging account. For example, the server 12 may contain one or more email mailboxes. Although the server 12 is described below in relation to a mail server for emails, it will be understood by those skilled in the art that other mechanisms for storage and transmission of messages can be implemented for other messaging types, such as instant messages, text messages, voicemails, etc.

The server 12 implements a mail transfer agent (MTA) software which handles the transfer of email messages between servers using mail transmission standards such as the Simple Mail Transfer Protocol (SMTP) and/or Extended SMTP (ESMTP). By way of example, the server 12 may be a Microsoft® Exchange™ Server, supporting the use of Exchange ActiveSync® protocol for synchronizing emails, contacts, calendar, tasks and notes. An email message directed to a message mailbox 13 is routed to the server 12. For example, the server 12 may be identified as a target host, based on the domain name associated with the message mailbox 13, and the message may be sequentially relayed between a series of MTAs until the server 12 accepts the incoming message. The final delivery of the message to the recipient message mailbox may be performed by a message delivery agent (MDA), which receives the message from an MTA and saves the message in the relevant mailbox format at the server 12.

Once the message is delivered to the local server 12, the message is stored for batch retrieval by authenticated messaging clients, or mail user agents (MUAs). A messaging client application on a mobile device facilitates access and management of messages stored on the server 12. In particular, a messaging client application provides a platform to access messages delivered to one or more email addresses. In at least some embodiments, a messaging client application may implement a protocol for retrieving messages from a server, such as Internet Message Access Protocol (IMAP) or Post Office Protocol (POP3). For example, a messaging client application can request to download messages from a message mailbox 13 to local storage or to remotely manage the message mailbox 13 on the server 12.

A message mailbox 13 on the server 12 may include a plurality of mailbox folders 24. Organizing messages into distinct mailbox folders can facilitate meaningful classification of the messages, efficient search of message content, distribution of message volume and expeditious access. A new folder can be created in the message mailbox 13, either from server-side by an administrator of the server 12 or from within a messaging client application on a mobile device. By way of example, an administrator of the server 12 can create a new folder in the message mailbox 13 by specifying a name and a folder hierarchy (e.g. parent folder) for the new folder. As a further example, an end user of a messaging client application, such as Microsoft Outlook®, can create additional folders within the application and the newly created folders may be automatically synchronized with a corresponding Microsoft® Exchange™ server.

The messages in a message mailbox may be organized into conversations. A conversation is used to group a message with one or more related messages that are typically associated with the same conversation subject. For example, multiple messages having the same subject line may be grouped into a single conversation. In some cases, a server may employ one or more heuristics in recognizing that a plurality of messages belong to the same conversation, even if the conversation subject has been modified. A conversation includes an original message and a running list of succeeding reply messages. A reply to or a forward of any message belonging to a conversation may also be included in the conversation. Organizing messages into conversations facilitates expedient access to messages that share the same subject and helps to reduce cluttering of mailbox folders. Use of conversations can also allow a user to quickly reply to one or a plurality of recipients of a conversation while providing the user with the ability to review contents of specific messages within the context of a hierarchy of related messages.

A conversation can include a single message or a plurality of related messages. For example, a message that does not have any preceding related messages or succeeding replies may be identified as a conversation consisting of a single message. A conversation may also contain one or more sub-conversations. A sub-conversation can be formed when a recipient in a conversation replies to a preceding message in the conversation by modifying the recipients. For example, a subset of the recipients of the original message in a conversation may form a sub-conversation from which at least some of the recipients of the original message are excluded.

The messages of a conversation may reside in one or more different mailbox folders. That is, a conversation may include messages that are stored in a plurality of distinct mailbox folders, such as an "Inbox" folder, a "Sent Items" folder and a "Deleted Items" folder. For example, a single message in a conversation may be deleted from the "Inbox" folder of a message mailbox, causing that message to be moved to a "Deleted Items" folder. The message may be deleted without causing any other messages of the conversation, such as preceding messages or succeeding replies and forwards, to also be deleted. As another example, a message that is being composed by a user in reply to one or more preceding messages of a conversation may be temporarily saved in a "Drafts" folder of the message mailbox prior to the message being completed and sent to the recipients of the conversation. In such cases, messages of the conversation that are stored, for example, in the "Inbox" or "Sent Items" folders, reside in different mailbox folders than a draft message that is in the process of being composed.

When a mobile device 20 establishes a connection to the server 12, the mobile device 20 may receive information regarding the one or more message mailboxes 13 that are stored on the server 12. In particular, the mobile device 20 may obtain a list of all mailbox folders associated a message mailbox 13. In some embodiments, the mobile device 20 may be configured to compare the list of folders of the message mailbox 13 with the set of local mailbox folders that have been set up on the device, for example, within a messaging client application.

A messaging client application on a mobile device 20 may poll or query the server 12 for new message data. In response, the server 12 may send any newly-arrived message data or other updates (e.g. messages deleted from a message mailbox, sent messages, etc.). The synchronization poll-and-update may extend to other non-message related items, such as calendars, notes, reminders or data for other applications. In some embodiments, the messaging client application may implement a synchronization protocol, such as Microsoft® Exchange ActiveSync®, which provides a real-time push mail solution. A push mail solution can keep a mobile device current over a wireless network connection by notifying the device when new content is ready to be synchronized.

Synchronizing Messages on a Mobile Device

Figure 2:
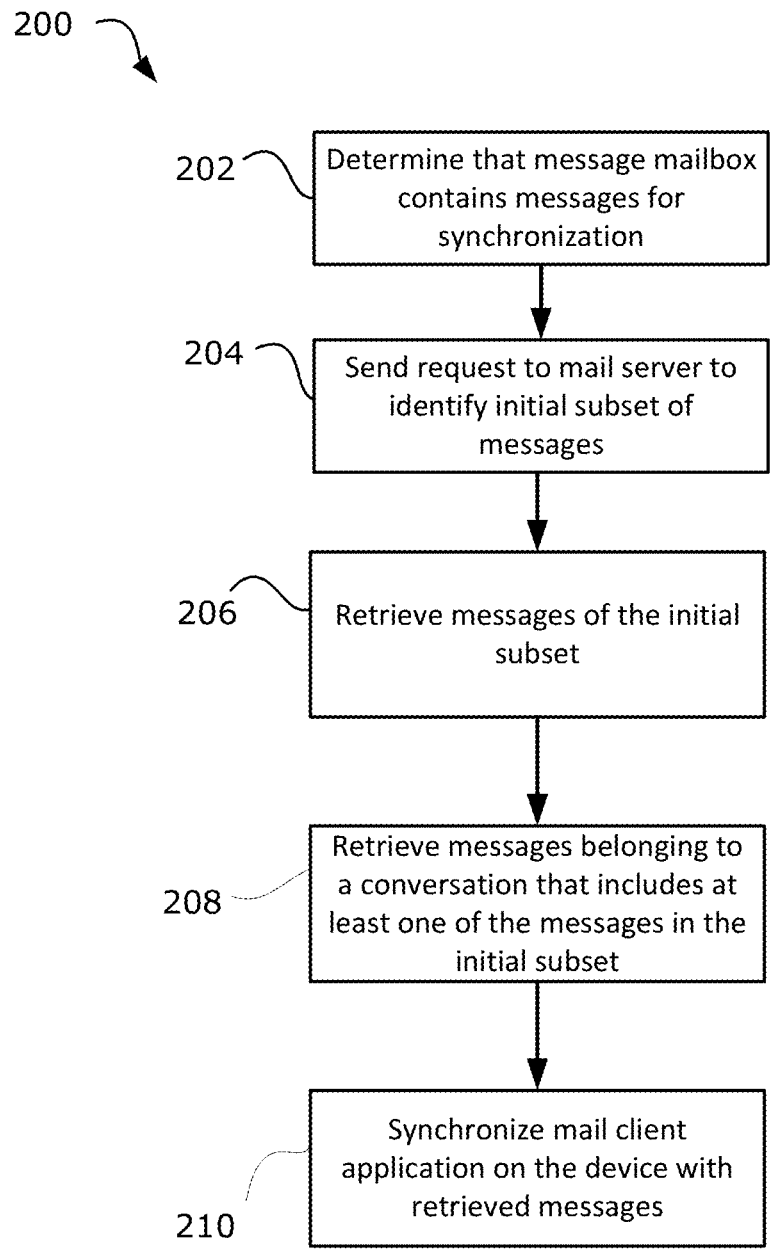
FIG. 2 is a flowchart illustrating an example method of synchronizing a mobile device with a message mailbox on a server.

Reference is now made to FIG. 2, which shows, in flowchart form, an example method 200 for synchronizing a mobile device with a message mailbox on a server. The method 200 may be implemented by a processor of the mobile device. For example, the method 200 may be performed by a new mobile phone during initial provisioning or activation procedures.

The method 200 relates to synchronization of message mailbox data on a mobile device. More specifically, the method 200 may be performed by a mobile device for selectively synchronizing a local mailbox on the mobile device with message data from a message mailbox on a remote server. In at least some embodiments, the method 200 can be implemented to synchronize a local mailbox in a messaging client application which has already been initialized and populated with message data from a server. In some other embodiments, a mobile device can perform the method 200 during an initial synchronization process for retrieving messages for the first time from a message mailbox to the device. For example, the method 200 may be executed during an initial setup of an account in a messaging client application on the mobile device, where the account represents a local mail storage corresponding to a message mailbox on a server.

A message mailbox may store a large number of messages. Due to constraints such as device storage capacity, download bandwidth speeds and mobile data usage limits, it is often not feasible to retrieve all messages of a message mailbox simultaneously. Consequently, when synchronizing a mobile device with message data from a message mailbox on a server, only a subset of all messages of the message mailbox may be retrieved from the server. Furthermore, the retrieval of messages to the mobile device in a synchronization process may proceed according to one or more algorithms for determining an order of retrieving messages. Given the potential constraints associated with a synchronization process, a user of a mobile device may desire to receive those messages that are relatively more important or urgent for the user before other messages of the message mailbox during synchronization.

In addition to prioritizing more important or relevant messages during synchronization on a device, the user may also desire to acquire proper context for the messages that are being synchronized. The degree of relevance or importance of a particular message for a user may depend on the significance of that message within the broader context of a conversation. In a conversation, the context for a message can often only be understood by reviewing the content of at least some of the other messages of the conversation and the position of that message within the message hierarchy of the conversation.

The present disclosure describes methods for synchronizing a mobile device with a message mailbox that can account for the relevance and context of the messages to be synchronized. More specifically, messages are synchronized "by conversation", with an initial subset of relevant messages being retrieved and messages from the conversations corresponding to the messages of the initial subset being retrieved prior to messages that do not belong to any of those conversations. In particular, message bodies of a plurality of messages for synchronization may be retrieved according to an order determined by conversational groupings, rather than a generic chronological order of date/time of receipt.

In operation 202, the mobile device first determines that the message mailbox contains a plurality of messages for synchronization. In at least some embodiments, the mobile device queries the server to determine whether there are messages that can be synchronized to the device. For example, the device may be configured to monitor the time associated with a most recent synchronization with the message mailbox. The device can query the server, either periodically or in response to a prompt for synchronization, to determine whether the message mailbox contains messages that have not been retrieved to the device since the most recent synchronization. In some other embodiments, the server may notify the mobile device when new or as-yet unsynchronized message data is available in the message mailbox. For example, the server may receive a status of a local mailbox from the mobile device and determine that there is a difference between the local mailbox and the message mailbox on the server. In response to such determination, the server may provide a notification, such as a push notification, to the mobile device, indicating that messages for synchronization are available.

The mobile device may also be configured to receive, from the server, header information associated with messages in the message mailbox. For example, the mobile device may receive metadata containing information associated with each of the messages in the message mailbox prior to performing any synchronization with the message mailbox.

In operation 204, the mobile device sends a request to the server to identify an initial subset of the most recently received messages from among the plurality of messages for synchronization in the message mailbox. That is, the mobile device queries the server to identify, from the plurality of messages that are available to be synchronized to the device, an initial subset of messages which were received most recently in the message mailbox. In at least some embodiments, the mobile device may request the server to identify a predetermined number of most recently received messages for the initial subset. By way of example, in some cases, a maximum number of messages for the initial subset may be specified. The value of the predetermined number of messages for the initial subset may be a design choice and, thus, can be selected by a user of the mobile device or fixed by a server administrator based on characteristics and restrictions of the mailbox search mechanism. For example, a messaging client application on a device may provide an option for the device user to input a value for the number of messages that the server should identify for the initial subset during synchronization. This user-selected value can then be transmitted to the server via the request from the device.

In at least some embodiments, the initial subset of the most recently received messages from among the plurality of messages for synchronization may include only those messages belonging to one or more pre-selected mailbox folders. That is, the initial subset of most recently received messages may be identified from among only those messages that belong to selected folders. In particular, the request to the server to identify the initial subset may request to identify a predetermined number of the most recently received messages belonging to one or more specific mailbox folders. By way of example, the initial subset may consist of a predetermined number of the most recently received messages in the "Inbox" and/or "Sent Items" folder (or any other selected folders) and not include recently received messages from any other mailbox folders. In some cases, the device user may be presented with an option of selecting the one or more mailbox folders from which the initial subset of most recently received messages may be identified. In some other cases, the initial subset of messages may be identified from one or more default mailbox folders (e.g. "Inbox" folder).

In identifying the messages for the initial subset, the server may compare received timestamps associated with the messages in the message mailbox. For example, the server may perform an open-ended query to search all folders of the message mailbox and, from the messages which have the latest received dates and/or times among all messages, select one or more of those messages that have yet to be synchronized to the mobile device for inclusion in the initial subset. Alternatively, the server may search only the plurality of messages for synchronization to identify the messages having the latest received dates and/or times and select one or more of those messages for inclusion in the initial subset. In some embodiments, the server may be configured to ensure that the initial subset of messages includes at least some messages that do not belong to the same conversation. In particular, the initial subset may be selected so that at least some of the messages identified for inclusion in the initial subset are contained in distinct conversations.

As explained above, synchronization of messages may be constrained by external factors such as device storage capacity and mobile download bandwidth speed. Due to such constraints, it is often desirable or necessary to retrieve only portions of the bodies of messages during synchronization rather than entire message bodies. Indeed, in many cases, entire message bodies may not need to be retrieved to a device in order for the device user to be productive with the synchronized messages. Such partial synchronization of messages may, at times, not provide a user with sufficient context to understand the significance of a specific message. For example, when a message from a conversation is partially synchronized to a device, only a limited amount of its message body may be retrieved. In particular, quoted text from preceding messages in the conversation may not be retrieved to the device during synchronization. Consequently, partial synchronization of message bodies can sometimes leave a device user with insufficient context for the retrieved messages.

In operation 206, the messages of the initial subset identified by the server are retrieved by the mobile device. In at least some embodiments, only portions of the bodies of the messages in the initial subset may be retrieved. In particular, the mobile device may retrieve a predetermined amount of message body data for each of the messages in the initial subset. For example, a messaging client application on a device may provide the device user with the option to specify a maximum amount of message body data to retrieve for any message during email synchronization. In such cases, the device may be configured to retrieve no more than the specified maximum amount for each of the messages in the initial subset. The amount of message body to retrieve to a device may be readily customizable by the device user. For example, the messaging client application on a device may allow the user to increase or decrease the message body retrieval limit through a graphical user interface (GUI) associated with the application. Such customization may be available to the device user before, during or after a synchronization process.

For each of the messages in the initial subset, a conversation containing the message is identified. A conversation may be identified by an identifier associated with the first or original message in the conversation. For example, the original message of a conversation may have an associated message identifier value. All replies and related messages in the conversation may reference the original message's identifier value in at least one of their header fields. In some embodiments, a value other than the message identifier for the original message of a conversation may be used to identify the conversation. For example, a unique identifier that is not associated with a specific message may be assigned to all messages of a conversation and included in their headers. Based on the metadata contained in the header of a message of the initial subset, the mobile device and/or the server may be able to identify the conversation to which the message belongs.

In operation 208, the mobile device retrieves messages belonging to a conversation that includes at least one of the messages in the initial subset. In at least some embodiments, the mobile device may retrieve a predetermined number of messages, other than those messages that are included in the initial subset, from each conversation that includes at least one of the messages in the initial subset. The predetermined number of messages from a conversation containing a message from the initial subset may usefully provide relevant context for the message of the initial subset. The mobile device retrieves the messages belonging to the conversations that include messages of the initial subset before retrieving any messages that do not belong to any conversation that includes at least one of the messages in the initial subset. That is, the mobile device does not retrieve any messages not belonging to a conversation that includes a message of the initial subset until after the messages from those conversations have been retrieved.

In this way, messages are synchronized "by conversation", by retrieving an initial subset of messages from the message mailbox as well as messages from the conversations that include those messages of the initial subset, before retrieving any other messages of the message mailbox not belonging to those conversations. Synchronizing messages in this way, i.e. "by conversation", may avoid scenarios in which messages that are retrieved according to a purely chronological order from a server have insufficient context on the device side for the user of the device to be productive with the retrieved messages. For example, for message mailboxes that typically receive a large number of messages, a first message and a second message of a particular conversation may be separated by many messages that were received in the period between the receipt times associated with the first and second messages. This might mean that if messages are synchronized to a device in chronological order, retrieval of messages of the same conversation (e.g. the first and second messages) that may be required to provide context for each other may be scheduled far apart, potentially rendering the synchronization of messages ineffective for a device user. By prioritizing the retrieval of a select number of messages of the same conversations before retrieving messages not belonging to those conversations, the method 200 may provide a message synchronization that results in retrievals of contextually meaningful groupings of messages for the device user.

In at least some embodiments, the mobile device retrieves one or more of the most recently received messages belonging to the conversations containing messages of the initial subset. For example, the mobile device may retrieve a predetermined number of the most recently received messages, other than messages of the initial subset, from each conversation that includes a message in the initial subset. The value of the predetermined number may be designated by a user of the device or set by an administrator of the server. It should be noted that, in some cases, a conversation containing a message of the initial subset may have less than the predetermined number of messages. In such cases, the predetermined number may be considered a maximum number of messages to retrieve from the conversation containing a message of the initial subset. For example, if a conversation that includes a message of the initial subset contains less than the predetermined number, all messages of the conversation, including the message of the initial subset, may be retrieved by the mobile device, prior to any messages not belonging to conversations containing a message of the initial subset. The messages belonging to conversations containing messages of the initial subset may be retrieved from any mailbox folder of the message mailbox. In particular, the retrieval of the most recently received messages in the conversations corresponding to the initial set may span multiple mailbox folders. That is, in at least some embodiments, there may be no restrictions on which mailbox folders these most recently received messages may be retrieved from.

Other criteria for selection of messages to retrieve from conversations containing a message of the initial subset may be employed during synchronization. For example, the messages for retrieval may be the most recently accessed messages of a conversation containing a message of the initial subset other than the message of the initial subset. As another example, the messages that are retrieved may include flagged messages or other messages deemed to be important in the conversation, such as the first/original message. In some embodiments, the mobile device may retrieve messages from only a select number of mailbox folders of a message mailbox. For example, in some cases, the mobile device may only retrieve messages from a conversation containing a message from the initial subset that are stored in the "Inbox" and/or "Sent Items" folders (or any other selected folders).

Variants of these techniques for identifying messages to retrieve from conversations that include a message of the initial subset may be available. Furthermore, a plurality of different factors may be considered in combination when identifying the messages to be retrieved. The mobile device may be configured to attribute different weights to the plurality of factors when making a selection of the messages to retrieve. Accordingly, in some embodiments, the selection of messages to retrieve may proceed by ranking the messages based on a score associated with each of the messages of a conversation that includes a message of the initial subset, where the score for a message is derived from a weighting of two or more factors.

In at least some embodiments, the messages of the initial subset identified by the server may be retrieved before the messages from the conversations containing the messages of the initial subset. More specifically, all messages of the initial subset may be retrieved to the device first, prior to retrieving the messages belonging to the conversations that include messages of the initial subset. The mobile device may be capable of determining which message bodies to retrieve from the server, based on header information associated with messages of the message mailbox previously received from the server. For example, the mobile device may send to the server requests to receive specific messages, the requests including identifying information for the messages to be retrieved. In some other embodiments, the messages of the initial subset and the messages from the conversations containing the messages of the initial subset may be retrieved together. That is, after the initial subset is identified by the server, the mobile device may retrieve the messages of the initial subset as well as messages belonging to conversations that include messages of the initial subset concurrently.

A local mailbox on the mobile device may be populated with the retrieved messages of the initial subset and messages belonging to conversations that include messages of the initial subset in operation 210. For example, the retrieved messages may be downloaded to a messaging client application during initial setup of the application. In the local mailbox, a message of the initial subset may be associated with messages that are retrieved from the conversation containing the message of the initial subset. In particular, the local mailbox may indicate a correspondence between a message of the initial subset and messages associated with the message of the initial subset by, for example, arranging all retrieved messages into a conversation format. Such correspondence may allow a device user to review the context of a message of the initial subset by conveniently accessing messages that belong to the conversation associated with the message of the initial subset, after synchronization.

Figure 3:
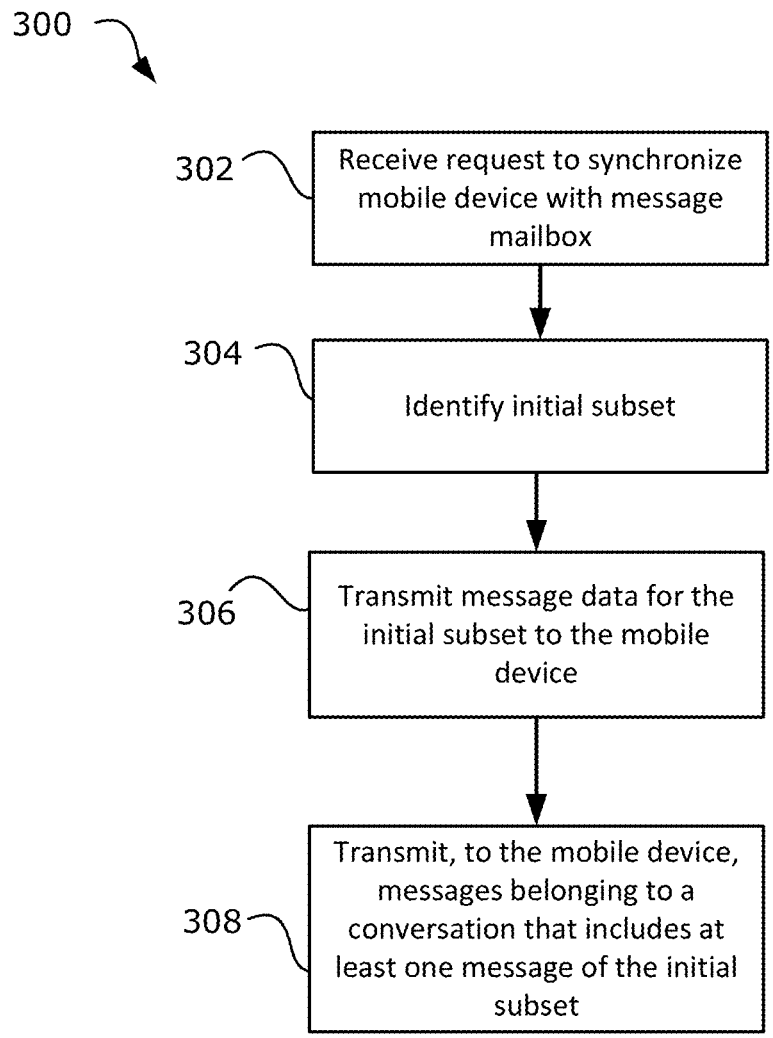
FIG. 3 is a flowchart illustrating another example method of synchronizing a mobile device with a message mailbox on a server.

A method similar to method 200 of FIG. 2 may be implemented by a server to synchronize a mobile device with messages stored on the server. Reference is made to FIG. 3, which shows an example method 300 for message synchronization performed by a server. The method 300 may be implemented by one or more processors of a server that contains message mailboxes with which a mobile device desires to synchronize. In some embodiments, a synchronization server that is distinct from the server storing the messages for synchronization may perform the steps of method 300.

In operation 302, the server receives a request from the mobile device to synchronize the device with a message mailbox on the server. The request may be initiated by a user of the mobile device or by the device itself at regular or predetermined intervals. For example, the request may be sent from a mobile device undergoing an initial setup of messaging accounts.

In response to receiving the request for synchronization, in operation 304, the server identifies an initial subset of most recently received messages from among a plurality of messages for synchronization in the message mailbox. For example, the server may identify a predetermined number of the plurality of messages that were received most recently in the message mailbox for inclusion in the initial subset.

After identifying the messages of the initial subset, the server initiates transmission of message body data for the initial subset to the mobile device in operation 306. In at least some embodiments, the server may transmit only portions of message bodies to the mobile device. A user of the device may specify, via an input means associated with the device, a limit for the amount of message bodies to retrieve for each of the messages of the initial subset and the limit value can be relayed to the server. Alternatively, the limit for retrieval of message bodies may be set remotely by an administrator of the server.

In operation 308, the server transmits messages belonging to conversations that include at least one of the messages of the initial subset, prior to any more recently received messages that do not belong to any of those conversations. In at least some embodiments, the server transmits a predetermined number of the most recently received messages, other than messages in the initial subset, from each conversation that includes at least one of the messages of the initial subset.

Figure 4:
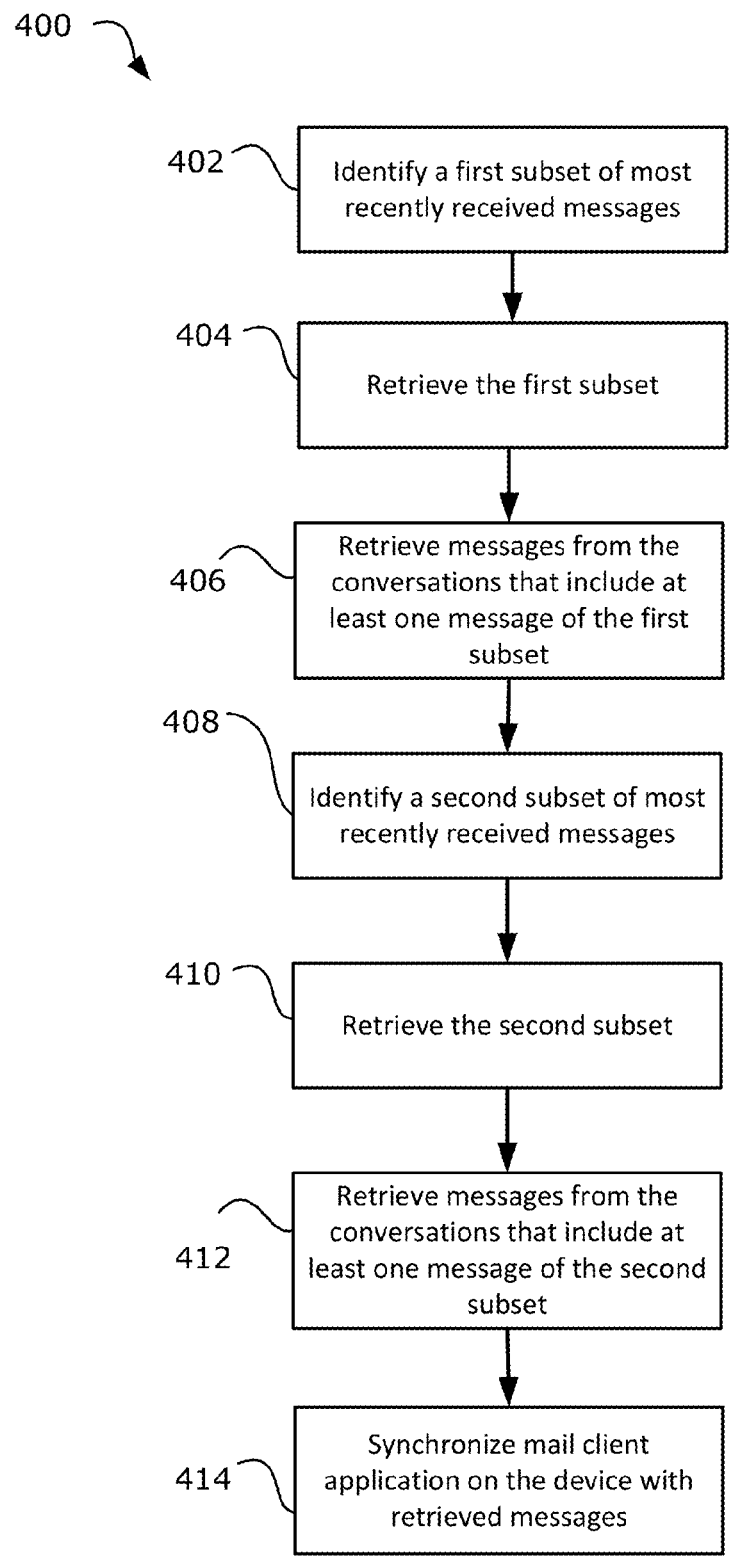
FIG. 4 is a flowchart illustrating another example method of synchronizing a mobile device with a message mailbox on a server.

Reference is now made to FIG. 4, which illustrates an example method 400 performed by a mobile device for synchronizing messages with a message mailbox on a server. The method 400 provides a structured technique for synchronizing messages to the mobile device in stages. Operations 402, 404 and 406 correspond to operations 204, 206 and 208 of FIG. 2, respectively. More specifically, a first subset of most recently received messages from among a plurality of messages for synchronization may be identified by the server and messages of the first subset as well as messages belonging to conversations that include the messages of the first subset are retrieved by the mobile device.

In operation 408, a second subset of recently received messages from the plurality of messages for synchronization is identified. The second subset does not contain any of the messages previously retrieved to the mobile device, namely, the messages of the first subset and the messages belonging to conversations containing messages in the first subset which were already retrieved by the mobile device. In particular, the messages of the second subset may be messages which were received before the messages of the first subset in the message mailbox. That is, the second subset of messages is less recent than the first subset of messages. In some embodiments, messages of the second subset may be selected in such a way as to exclude any previously retrieved messages and messages from conversations that include any of the previously retrieved messages. Such technique of selecting the second subset of messages may allow a wider range of messages and/or conversations to be synchronized to the device. Specifically, this technique may help to avoid retrieving redundant messages of those conversations from which messages have already been retrieved.

In operation 410, the second subset of messages is retrieved to the mobile device. The mobile device subsequently retrieves messages from conversations that include at least one message from the second subset, in operation 412. For example, a predetermined number of most recently received messages, not previously retrieved to the mobile device, in each conversation that contains a message from the second subset can be retrieved.

Additional iterations of method 400 may be performed to retrieve previously unsynchronized messages. More specifically, additional subsets (e.g. third subset, fourth subset, etc.) of recently received messages that have yet to be synchronized may be selected for retrieval and messages from the conversations that include messages of the selected subsets can be retrieved. In this way, the synchronization of messages can proceed in stages according to groupings of messages by conversations. In operation 414, a mail client application on the device is synchronized with the retrieved messages by indicating a correspondence between related messages belonging to the same conversations.

Example Mobile Device

Figure 5:
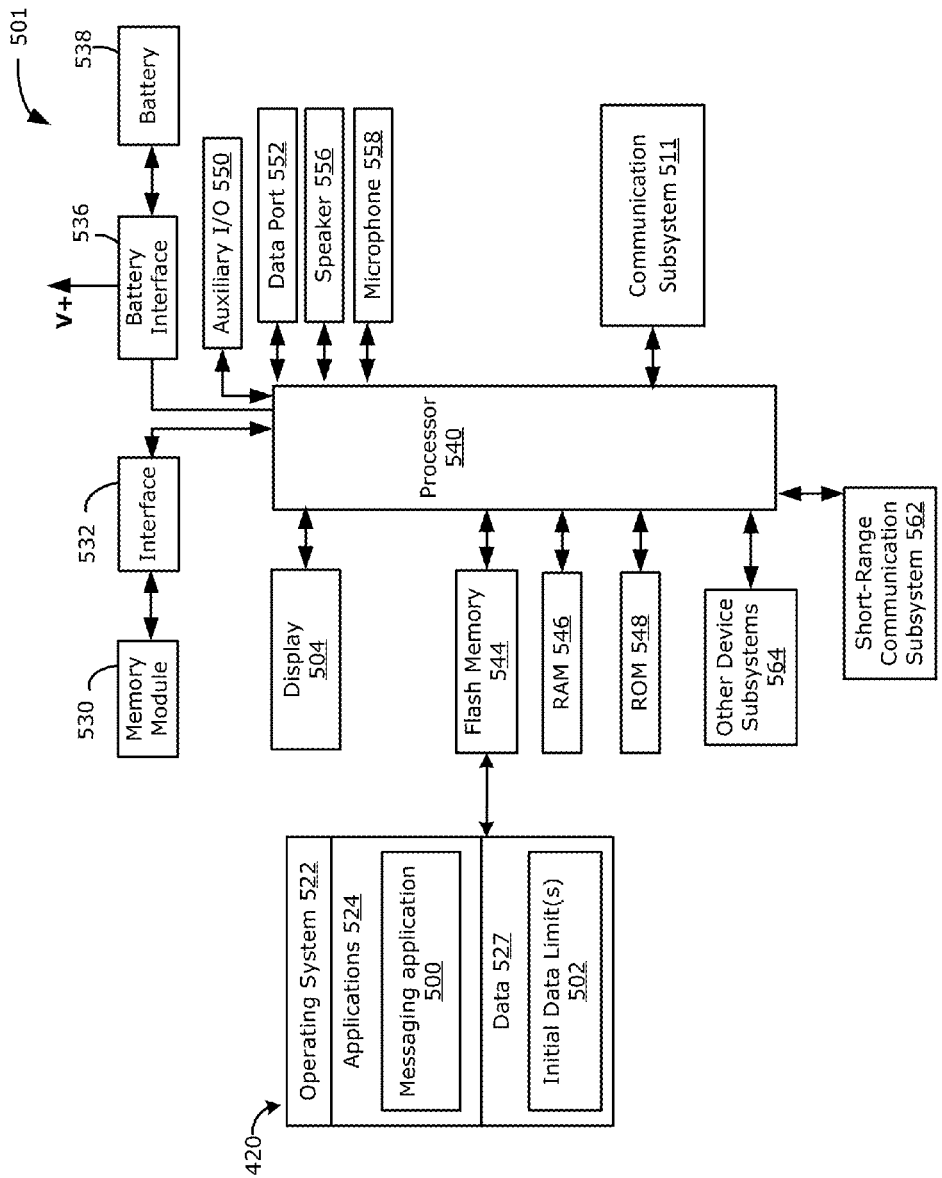
FIG. 5 is a block diagram illustrating components of an example mobile device in accordance with embodiments of the present disclosure.

Reference will now be made to FIG. 5, which illustrates an example electronic device 501. In the illustrated example embodiment, the electronic device 501 is a mobile communication device. In at least some example embodiments, the mobile communication device is a two-way communication device having data and possibly voice communication capabilities, and the capability to communicate with other computer systems; for example, via the Internet.

The electronic device 501 of FIG. 5 includes a housing (not shown) which houses components of the electronic device 501. Internal components of the electronic device 501 may be constructed on a printed circuit board (PCB). The electronic device 501 includes a controller including at least one processor 540 (such as a microprocessor) which controls the overall operation of the electronic device 501. The processor 540 interacts with device subsystems such as a wireless communication subsystem 511 for exchanging radio frequency signals with a wireless network to perform communication functions. The processor 540 interacts with additional device subsystems including one or more input interfaces 506 (such as a keyboard, one or more control buttons, one or more microphones 558, a gesture sensor 561, and/or a touch-sensitive overlay associated with a touch-screen display), flash memory 544, random access memory (RAM) 546, read only memory (ROM) 548, auxiliary input/output (I/O) subsystems 550, a data port 552 (which may be a serial data port, such as a Universal Serial Bus (USB) data port), one or more output interfaces (such as a display 504 (which may be a liquid crystal display (LCD)), one or more speakers 556, or other output interfaces), a short-range communication subsystem 562, and other device subsystems generally designated as 564.

The electronic device 501 may include a touchscreen display in some example embodiments. The touchscreen display may be constructed using a touch-sensitive input surface connected to an electronic controller. The touch-sensitive input surface overlays the display 504 and may be referred to as a touch-sensitive overlay. The touch-sensitive overlay and the electronic controller provide a touch-sensitive input interface and the processor 540 interacts with the touch-sensitive overlay via the electronic controller. That is, the touchscreen display acts as both an input interface and an output interface.

The electronic device 501 may communicate with any one of a plurality of fixed transceiver base stations of the wireless network within its geographic coverage area using the communication subsystem 511. The electronic device 501 may send and receive communication signals over the wireless network after the required network registration or activation procedures have been completed.

In some example embodiments, the auxiliary input/output (I/O) subsystems 550 may include an external communication link or interface, for example, an Ethernet connection. The communication subsystem 511 may include other wireless communication interfaces for communicating with other types of wireless networks; for example, Wi-Fi networks.

In some example embodiments, the electronic device 501 also includes a removable memory module 530 (typically including flash memory) and a memory module interface 532. Network access may be associated with a subscriber or user of the electronic device 501 via the memory module 530, which may be a Subscriber Identity Module (SIM) card for use in a GSM network or other type of memory module for use in the relevant wireless network type. The memory module 530 may be inserted in or connected to the memory module interface 532 of the electronic device 501.

The electronic device 501 may store data 527 in an erasable persistent memory, which in one example embodiment is the flash memory 544. In various example embodiments, the data 527 may include service data having information required by the electronic device 501 to establish and maintain communication with the wireless network. The data 527 may also include user application data such as email messages, address book and contact information, calendar and schedule information, notepad documents, image files, and other commonly stored user information stored on the electronic device 501 by its user, and other data.

The data 527 stored in the persistent memory (e.g. flash memory 544) of the electronic device 501 may be organized, at least partially, into a number of databases or data stores each containing data items of the same data type or associated with the same application. For example, email messages, contact records, and task items may be stored in individual databases within the electronic device 501 memory.

The electronic device 501 also includes a battery 538 as a power source, which is typically one or more rechargeable batteries that may be charged, for example, through charging circuitry coupled to a battery interface 536 such as the serial data port 552. The battery 538 provides electrical power to at least some of the electrical circuitry in the electronic device 501, and the battery interface 536 provides a mechanical and electrical connection for the battery 538. The battery interface 536 is coupled to a regulator (not shown) which provides power V+ to the circuitry of the electronic device 501.

The short-range communication subsystem 562 is an additional optional component which provides for communication between the electronic device 501 and different systems or devices, which need not necessarily be similar devices. For example, the short-range communication subsystem 562 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the electronic device 501 during or after manufacture. Additional applications and/or upgrades to an operating system 522 or software applications 524 may also be loaded onto the electronic device 501 through the wireless network, the auxiliary I/O subsystem 550, the data port 552, the short-range communication subsystem 562, or other suitable device subsystems 564. The downloaded programs or code modules may be permanently installed; for example, written into the program memory (e.g. the flash memory 544), or written into and executed from the RAM 446 for execution by the processor 540 at runtime.

The processor 540 operates under stored program control and executes software modules 520 stored in memory such as persistent memory; for example, in the flash memory 544. As illustrated in FIG. 5, the software modules 520 may include operating system software 522 and one or more additional applications 524 or modules such as, for example, a messaging client application 500. In the example embodiment of FIG. 5, the messaging client application 500 is illustrated as being implemented as a stand-alone application 524, but in other example embodiments, the messaging client application 500 could be implemented as part of the operating system 522 or another application 524.

The messaging client application 500 is configured to connect to the remote server and to obtain new message data from the server. It further provides a user interface for rendering on the display 504 to display message content and to receive user input in relation to the message content.

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

Example embodiments of the present disclosure are not limited to any particular operating system, mobile device architecture, server architecture, Internet standard protocol or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of a mobile device for executing synchronization of the mobile device with a message mailbox on a server, the message mailbox containing a plurality of messages for synchronization, the method comprising:

sending a request to the server to identify an initial subset of most recently received first messages from among the plurality of messages;

retrieving the initial subset of first messages from the server;

retrieving, from the server, messages belonging to a conversation that includes at least one of the first messages, prior to retrieving more recently received messages that are not in the initial subset and do not belong to any conversation that includes at least one of the first messages; and populating a local mailbox on the mobile device with the retrieved first messages and messages belonging to conversations that include at least one of the first messages by indicating a correspondence between each first message and those messages belonging to a conversation containing said first message.

2. The method of claim 1, wherein sending the request to the server to identify the initial subset of most recently received first messages from among the plurality of messages comprises sending a request to identify a predetermined number of the plurality of messages that were received most recently in the message mailbox.

3. The method of claim 1, wherein sending the request to the server to identify the initial subset of most recently received first messages from among the plurality of messages comprises sending a request to identify a predetermined number of the plurality of messages that were received most recently in a pre-selected mailbox folder of the message mailbox.

4. The method of claim 1, wherein retrieving messages belonging to a conversation that includes at least one of the first messages comprises retrieving a predetermined number of messages, other than a first message, from each conversation that includes at least one of the first messages.

5. The method of claim 1, wherein retrieving messages belonging to a conversation that includes at least one of the first messages comprises retrieving most recently received messages, other than a first message, from each conversation that includes at least one of the first messages.

6. The method of claim 1, further comprising associating, at the mobile device, retrieved messages belonging to a conversation that includes a first message with the conversation.

7. The method of claim 1, further comprising, prior to sending the request to the server, receiving header information associated with each of the plurality of messages.

8. The method of claim 1, wherein retrieving messages from the server comprises retrieving only portions of message bodies of the messages.

9. The method of claim 7, further comprising receiving an input indicating a maximum amount of message body data to retrieve for a message during the synchronization and wherein retrieving messages from the server comprises retrieving no more than the maximum amount of message body data for a message.

10. The method of claim 1, wherein the method is executed during an initial setup of an account in a messaging client application on the mobile device, the account corresponding to the message mailbox.

11. A method implemented by a processor of a server, the method comprising:
    receiving, from a mobile device, a request for synchronizing the mobile device with a message mailbox on the server, the message mailbox containing a plurality of messages for synchronization; and
    in response to receiving the request:
        identifying an initial subset of most recently received first messages from among the plurality of messages;
        transmitting message data for the initial subset of first messages to the mobile device;
        transmitting, to the mobile device, messages belonging to a conversation that includes at least one of the first messages, prior to transmitting more recently received messages that are not in the initial subset and do not belong to any conversation that includes at least one of the first messages; and
        populating a local mailbox on the mobile device with the retrieved first messages and messages belonging to conversations that include at least one of the first messages by indicating a correspondence between each first message and those messages belonging to a conversation containing said first message.

12. The method of claim 11, wherein identifying the initial subset of most recently received first messages from among the plurality of messages comprises identifying a predetermined number of the plurality of messages that were received most recently in the message mailbox.

13. The method of claim 11, wherein transmitting messages belonging to a conversation that includes at least one of the first messages comprises transmitting a predetermined number of messages, other than a first message, from each conversation that includes at least one of the first messages.

14. The method of claim 11, wherein transmitting messages belonging to a conversation that includes at least one of the first messages comprises transmitting most recently received messages, other than a first message, from each conversation that includes at least one of the first messages.

15. The method of claim 11, further comprising, prior to identifying the initial subset, transmitting, to the mobile device, header information associated with each of the plurality of messages.

16. The method of claim 11, wherein transmitting messages to the mobile device comprises transmitting only portions of message bodies of the messages.

17. A mobile device, comprising:
    a memory;
    a communications subsystem;
    an input interface; and
    a processor coupled with the memory and the communications subsystem, the processor being configured to:
        send a request to a server to identify an initial subset of most recently received first messages from among a plurality of messages for synchronization in a message mailbox on the server;
        retrieve the initial subset of first messages from the server;
        retrieve, from the server, messages belonging to a conversation that includes at least one of the first messages, prior to retrieving more recently received messages that are not in the initial subset and do not belong to any conversation that includes at least one of the first messages; and
        populate a local mailbox on the mobile device with the retrieved first messages and messages belonging to conversations that include at least one of the first messages by indicating a correspondence between each first message and those messages belonging to a conversation containing said first message.

18. The mobile device of claim 17, wherein sending the request to the server to identify the initial subset of most recently received first messages from among the plurality of messages comprises sending a request to identify a predetermined number of the plurality of messages that were received most recently in the message mailbox.

19. The mobile device of claim 17, wherein retrieving messages belonging to a conversation that includes at least one of the first messages comprises retrieving a predetermined number of messages, other than a first message, from each conversation that includes at least one of the messages in the initial subset.

20. The mobile device of claim 17, wherein retrieving messages belonging to a conversation that includes at least one of the first messages comprises retrieving most recently received messages, other than a first message, from each conversation that includes at least one of the first messages.

21. The mobile device of claim 17, wherein the processor is further configured to associate, at the mobile device, retrieved messages belonging to a conversation that includes a first message with the conversation.

* * * * *